May 23, 1967  L. MANDELCORN ET AL  3,321,677
ELECTROLYTIC CAPACITOR HAVING ELECTRODE CONTAINING
NIOBIUM-ZIRCONIUM-TITANIUM
Filed Aug. 31, 1964
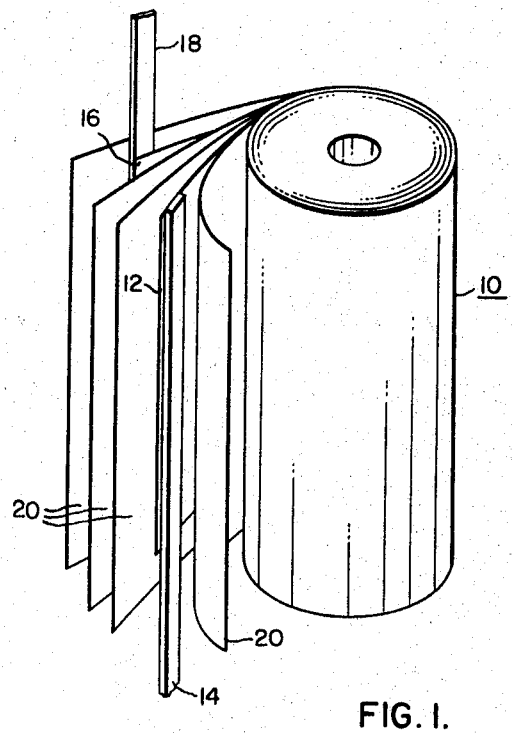
FIG. I.
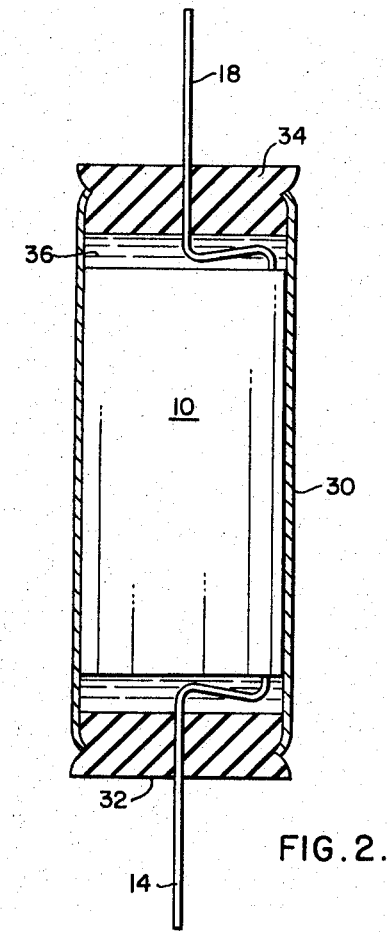
FIG. 2.
WITNESSES
INVENTORS
Lyon Mandelcorn &
Thomas W. Dakin
BY
ATTORNEY ＃ 3,321,677
ELECTROLYTIC CAPACITOR HAVING ELECTRODE CONTAINING NIOBIUM-ZIRCONIUM-TITANIUM
Lyon Mandelcorn, Pittsburgh, and Thomas W. Dakin, Murrysville, Pa., assignors to Westinghouse Electric Corporation, Pittsburgh, Pa., a corporation of Pennsylvania
Filed Aug. 31, 1964, Ser. No. 393,130
7 Claims. (Cl. 317—230)

This invention relates to niobium-zirconium-titanium alloys and more particularly it pertains to electrolytic capacitors prepared therefrom. Most of the electronic circuits for highest reliability and high operating temperature for both civilian and military needs are presently dependent upon tantalum electrolytic capacitors. Tantalum is highly reliable for that purpose because when anodized the metal forms a substantially impervious dielectric film of tantalum oxide that is uniform and is conducive to durable capacitors. For these reasons as well as the advanced technology of tantalum, it had been thought that no other metal or alloy would satisfy the present specifications for electrolytic capacitors.

Other conditions, however, raise questions regarding extensive continued use of tantalum as electrodes in electrolytic capacitors. The world supply of tantalum and particularly that of the United States is limited. In addition, purification of tantalum to capacitor grade material is exacting and costly. As a typical impurity, iron cannot exceed 50 p.p.m. concentration. Small amounts of impurities have an extremely deleterious effect upon the effectiveness of tantalum in capacitors. As a result there has been a need for other metals or alloys, which are more plentiful, less costly to process and fabricate, and which can be anodically coated with oxide films that would be as effective as tantalum oxide in capacitor applications.

Unalloyed niobium anodized with a surface oxide as inferior as a capacitor dielectric to tantalum with an anodic oxide surface film in characteristics and performance. The anodic oxides of other related metals such as zirconium, titanium, and vanadium are likewise less satisfactory than tantalum for use in electrolytic capacitors. Only aluminium forms a desirable anodic oxide, but even this fails at the higher operating temperatures at which tantalum capacitors are usable and is considered less reliable. With aluminum, small amounts of impurities materially impair its use in capacitors.

Further, some niobium-base binary alloys form anodic oxides that are inferior in some properties to anodic tantalum oxide, but other binary alloys form mixed surface oxides, when anodized, that are comparable to tantalum oxide in such properties as low leakage current and excellent thermal aging characteristics. But some of these latter niobium base binary alloys having combined capacitor properties comparable to those of tantalum, are difficult to fabricate and roll into wire or foil which are preferred forms of capacitor anodes.

It has been found that an anodic oxide of certain titanium-zirconium-niobium ternary alloys is at least as stable as, and as easy to form as anodic oxides of any single metal or any known binary alloy. Moreover, small amounts of impurities are not as detrimental to the capacitor characteristics of these ternary alloys as they are to unalloyed tantalum or aluminum. These ternary alloys are easy to form into foil or wire.

Accordingly, it is an object of this invention to provide certain niobium-zirconium-titanium alloys for producing an electrolytic capacitor having characteristics and performance equal to or better than tantalum.

It is another object of this invention to provide certain niobium-zirconium-titanium alloys for use as anodes in an electrolytic capacitor and having capacitance per unit area $x$ voltage factors that compare favorably with tantalum.

It is another object of this invention to provide an electrolytic capacitor comprising as an anode certain niobium-zirconium-titanium alloys having an anodic surface oxide which minimizes leakage currents and provides good long life characteristics.

It is another object of this invention to provide a niobium-zirconium-titanium alloy that is less costly to prepare than tantalum for use in an electrolytic capacitor.

Finally, it is an object of this invention to provide a niobium-zirconium-titanium alloy that accomplishes the foregoing objects in a simple and effective manner.

For a better understanding of the nature and objects of the present invention, reference should be had to the following description and drawing in which:

FIGURE 1 is a view in perspective; and
FIGURE 2 is a cross-sectional view.

Briefly, the invention comprises (1) preparing the ternary alloys of niobium, zirconium and titanium, (2) working the alloys into foil, wire or other shapes having a large surface area to volume-ratio, (3) anodizing the surfaces of an alloy foil, for instance, in a forming electrolyte to produce a dense amorphous-like oxide, (4) disposing a second electrode near the surface of anodized foil and (5) applying a working electrolyte to the assembly whereby a capacitor is produced.

The ternary alloys of this invention more particularly comprise compositions, in which all proportions are by weight, having at least 20% but not exceeding 80% of niobium, from 5% to 60% by weight of zirconium, from 5% to 55% titanium and small amounts of incidental impurities totaling approximately 0.2% or less. It will be understood that the zirconium may be pure zirconium or the natural metal which normally includes up to about 2.3% of hafnium; likewise the niobium may be pure niobium or the niobium metal which often includes small amounts of tantalum. To this extent the hafnium and tantalum are considered not impurities but a constituent part of the respective zirconium or niobium metal.

The impurities present in the ternary alloy may comprise up to 700 p.p.m. (parts per million) of oxygen, up to 500 p.p.m. of silicon, up to 500 p.p.m. of iron, and smaller proportions of other elements such as copper, nitrogen and manganese as well as other elements.

Particularly good results are had with an alloy composed of from 50% to 60% niobium, 20% to 30% zirconium and 15% to 25% titanium. A preferred composition is about 55% by weight of niobium, 25% zirconium, and 20% titanium for best overall fabrication and capacitor performance.

The ternary alloys of this invention are readily prepared in ingots from reasonably pure available raw metal which are easily convertible into thin foils, sheets, wire and other shapes adapted for capacitor applications. For certain capacitor uses, a slug or mass of the alloy is prepared by compressing the alloy powder into a compact and sintering the compact to produce a porous body having a large surface area.

Ingots of the alloy may be produced by conventional techniques applicable to titanium, niobium or zirconium metal and then hot and cold worked. The highest purity metal ingredients are not necessary. In preparing the ingots an electrode is formed by joining, for instance, by tack welding, strips, wire, rod or bars of the three constituent metals in desired weight proportion and consumably arc melting the electrode under a vacuum into a first ingot. Electron beam melting may be employed. The first ingot is preferably remelted at least once by consumable or electron beam techniques under a good vacuum of about 1 micron or less, into a homogeneous ingot. The resulting ingot is extruded or hot forged, or both, under a protective atmosphere into a plate, bar or rod. Plates or bars of from 0.1 inch to .15 inch can be readily cold rolled in a Rohn or a Sendzimir mill to foil of ½ mil (0.0005 inch) thickness or thinner. Wire of a diameter of 0.01 to 0.0075 inch and less may be drawn from rod of a diameter of ¼ to ½ inch diameter. The foils and wire are flexible and excellent for subsequent processing into capacitors.

The foil, wire, plates, sintered slugs or other alloy metal shapes are then anodically oxidized in a forming electrolyte. Most electrolytes suitable for forming anodic films on tantalum or aluminum or niobium, which are well known, are suitable. Thus, dilute aqueous solutions of orthophosphoric acid, or orthophosphoric acid in water and ethylene glycol or other liquid glycols are suitable. The anodization voltages may be up to 600 volts. The anodization may be conducted at room temperature or up to about 100° C., the higher temperatures being used with electrolytes containing ethylene glycol. This produces on all surfaces exposed to the anodizing electrolyte an amorphous-like dielectric mixed oxide film.

As is well known, the anodically oxidized alloy foil, for instance, is combined with another metal sheet or foil (commonly a sheet of the same alloy—though anodized at a low voltage) to provide a cathode, including an insulating separator of paper, glass fibers or other insulating material, and the assembly is immersed in a working electrolyte. Numerous working electrolytes used for capacitors may be employed with the alloys of the present invention. Good results are had with borate-water-ethylene glycol, boric acid-ammonia-ethylene glycol or dimethylformamide-salt solutions such as tetra-alkyl ammonium salicylate. The rated voltage applied to the resulting capacitor normally does not reach much more than about 70% of the 90° C. forming voltage.

Referring to FIG. 1 of the drawing, there is illustrated a roll capacitor 10 embodying foils of the alloys of the present invention. The roll 10 is produced by winding a foil 12 of the anodized alloy which has a lead 14 crimped, welded or otherwise affixed to the end of the foil, a second foil 16 which may be of the same alloy, though not anodized to the same extent, with a lead 18 similarly affixed to the other end thereof, and at least one sheet 20 of paper or other insulating separator between the foils. One of the primary functions of the sheet 20 is to prevent the abrasion of the oxide film on the surfaces of the foils inasmuch as the dielectric film of anodic oxide on the foil surfaces withstands the voltages applied to the capacitor after the roll is immersed in the working electrolyte.

As shown in FIG. 2, the roll 10 is placed in a casing 30 provided with insulating disks or plugs 32 and 34 placed at the ends thereof, with leads 14 and 18 projecting therethrough to the exterior for connecting into an electrical circuit. The interior of casing 30 is filled with a working electrolyte 36. The casing 10 may be of metal and is insulated from contact with the electrodes or metal foils. The capacitors can be used at high voltages— up to 400 volts and higher.

Tests were made of a number of different alloys listed in Table I comprising various binary and ternary alloys of niobium, tantalum, zirconium, titanium, and molybdenum. All specimens in this group were anodized to 120 volts, applying 25 ma./in.$^2$, at room temperature with 0.01% $H_3PO_4$ (aqueous) as the forming electrolyte. The specimens were then aged at 125° C. at 60 volts, 50%, or more, of the formation voltage in order to test the relative merits of the several metals. During aging the working electrolyte was an ethylene glycol-ammonia-boric acid solution. The results of the foregoing experiments are listed in Table I.

TABLE I.—ANODIZATION OF ALLOYS & THERMAL-VOLTAGE AGING

| Alloy | Iron, p.p.m. | Anodization Behavior | Aging Behavior |
| --- | --- | --- | --- |
| Group A: | | | |
| 65% Nb, 25% Zr, 10% Ti | 30 | Good | Good. |
| 55% Nb, 25% Zr, 20% Ti | 150 | do | Do. |
| 25% Nb, 25% Zr, 50% Ti | 300 | do | Do. |
| 28% Nb, 52% Zr, 20% Ti | 300 | do | Do. |
| Group B: | | | |
| 80% Nb, 20% Ti | 335 | do | Fair. |
| 70% Nb, 10% Ta, 20% Ti | 20 | do | <500 hrs. |
| 50% Nb, 10% Ta, 40% Ti | 200 | do | <500 hrs. |
| 75% Nb, 20% Ti, 5% Mo | 60 | do | <500 hrs. |
| 70% Nb, 20% Ti, 10% Mo | 300 | do | <500 hrs. |
| 90% Ti, 10% Mo | 500 | Poor | |
| 90% Ti, 10% Zr | 140 | do | |
| 10% Ti, 90% Zr | 105 | do | |

It should be noted that the relative degree of impurity level in terms of iron content are listed for each alloy. The alloys are readily divided into two groups. The Group A alloys are far more satisfactory as anodes for electrolytic capacitors than the Group B alloys. All the electrolytic capacitors with the anodized Group A alloys sustained more than 1000 hours testing without failure.

In other tests the Group A alloys were also anodized to 290 volts, while other samples of the first two alloys of Group A were also anodized to 500 volts, all being anodized in an electrolyte containing 0.9 gram $H_3PO_4$ in 100 cc. of four parts of ethylene glycol to one part of water by volume. The thermal aging characteristics of the alloys with anodic oxides formed at 290 volts were excellent.

As shown in Table I, the anodized ternary alloys of Group A operate very well as the anode-dielectric elements in electrolytic capacitors despite their high iron content. It appears that the impurities are less deleterious in the ternary alloys than would be expected.

The best ternary alloy of those listed in Table I, consisted of 55% niobium, 25% zirconium, and 20% titanium. It displayed a better combination of desirable low leakage current, high capacitance, and formability than any of the other alloys listed. The second best alloy consisted of 65% niobium, 25% zirconium, and 10% titanium. Other alloys having lesser amounts of niobium and greater amounts of zirconium or titanium, such as 25% Nb, 25% Zr, 50% Ti and 28% Nb, 52% Zr, 20% Ti alloys had somewhat higher leakage current factors.

The best and second best alloys of Table I were additionally tested after samples were anodized at 120 volts and 290 volts. The performance data for the alloys with oxides formed at 120 volts is listed in Table II. These anodized specimens were tested in sealed bottles with about 0.5 in.$^2$ of anodized surface exposed to the working electrolyte.

TABLE II.—PERFORMANCE DATA FOR CAPACITORS FORMED AT 120 VOLTS

| Anode Composition | Aging Time, hrs. at 125° C. | Voltage | Cs, muf. at 125° C. | Cs, mμf. at R.T. | I/VC at 125° C. | D oxide, percent at 125° C. |
|---|---|---|---|---|---|---|
| 65% Nb, 25% Zr, 10% Ti | | | | ² 262 | | |
| | 65 | 60 | 289 | | | |
| | 904 | ¹ 90 | 252 | | 36×10⁻⁴ | |
| | 1,266 | 76 | | 244 | 326×10⁻⁴ | |
| | 2,272 | 76 | 247 | | 170×10⁻⁴ | ~1.0 |
| 55% Nb, 25% Zr, 20% Ti | | | | ² 280 | | |
| | 65 | 60 | 303 | | | |
| | 904 | ¹ 90 | 260 | | 50×10⁻⁴ | |
| | 1,266 | 76 | | 245 | 330×10⁻⁴ | |
| | 2,272 | 76 | 252 | | 99×10⁻⁴ | 0.83 |

¹ 70 hours.
² Initial.

$C_s$ is capacitance in millimicrofarads, while "D" is the loss or dissipation factor. The results listed include a final operating voltage of 76 volts at 125° C., i.e., more than 50% of the room temperature forming voltage. When the units were subjected to 80 and 90 volts, substantial reductions in capacitance occurred. However, there was no deleterious effect due to surging the samples at 100 volts, 30 seconds on and 5 minutes off, at 125° C.

Performance data for units formed at 290 volts are listed in Table III (the active anodized surface being about 0.5 in.²).

TABLE IV.—PERFORMANCE DATA FOR CAPACITORS FORMED AT 500 VOLTS

| Aging Temp. | Time at Temp., Hrs. | Cs, mμf. at Temp. | Cs, mμf. at R. T. | I/VC at Temp. |
|---|---|---|---|---|
| 125° C | | | ¹ 60 | |
| | 614 | 63 | 61 | 282×10⁻⁴ |
| | 1,440 | 61 | 58.5 | 1,360×10⁻⁴ |
| 125° C | | | ¹ 56 | |
| | 614 | 60 | 59 | 258×10⁻⁴ |
| | 1,440 | 69 | 53 | 312×10⁻⁴ |
| 145° C | | | ¹ 57 | |
| | 300 | 58.5 | | 2,400×10⁻⁴ |
| | 940 | 54.8 | | 2,000×10⁻⁴ |
| 145° C | | | ¹ 55 | |
| | 300 | 57 | | 3,700×10⁻⁴ |
| | 940 | 52.6 | | 2,350×10⁻⁴ |

¹ Initial.

TABLE III.—PERFORMANCE DATA FOR CAPACITORS FORMED AT 290 VOLTS

| Anode Composition | Aging Time, hrs. at 125° C. | Voltage | Cs, muf. at 125° C. | Cs, mμf. at R.T. | I/VC at 125° C. | D oxide, percent at 125° C. |
|---|---|---|---|---|---|---|
| 65% Nb, 25% Zr, 10% Ti | | | | ² 120 | | |
| | 82 | 144 | 165 | | 172×10⁻⁴ | |
| | 416 | ¹ 180 | 156 | | 246×10⁻⁴ | |
| | 616 | | | 118 | | |
| | 1,624 | 148 | 129 | | 575×10⁻⁴ | 2.7 |
| 55% Nb, 25% Zr, 20% Ti | | | | ² 118 | | |
| | 82 | 144 | 148 | | 150×10⁻⁴ | |
| | 416 | ¹ 180 | 123 | | 240×10⁻⁴ | |
| | 616 | | | 114 | | |
| | 1,624 | 148 | 123 | | 55×10⁻⁴ | 1.0 |

¹ 183 hours.
² Initial.

Table III lists some results for capacitors operating at a final voltage of 148 volts and 125° C. The samples, anodized at 290 volts, were overstressed at 180 volts during thermal aging, the voltage overstress resulting in the largest decreases in capacitance. But no deleterious effects occurred due to 200 volt surges, as above.

For comparison with tantalum, the current/voltage capacitance factor (I/VC) for 100 volt tantalytic capacitors at 125° C. is in the range of 100×10⁻⁴/second. It will be observed that the Table II and III values are well above those for tantalum. The formation voltage times capacitance per unit area values (VC/A) of the ternary oxide films are about 60 $\mu F-V_{form}/in.^2$, while for tantalum the corresponding values are 75 $\mu F-V_{form}/in.^2$.

Members of the alloy composed of 55% niobium, 25% zirconium, and 20% titanium were anodized in an electrolyte containing ethylene glycol-ammonia-boric acid with orthophosphoric acid at 90° C. and 500 volts. Samples, with active anodized areas of about 0.5 in.², were then aged at 350 volts at 125° C. and 145° C. as shown in Table IV.

The change in capacitance of anodized 55% niobium, 25% zirconium, and 20% titanium in a capacitor is between −4% to −5% when going from room temperature (25° C.) to −55° C. and is about +5% on going from room temperature to 125° C. Inasmuch as existing military specifications require that capacitance change not exceed +20% going from 25° C. to −55° C. for any capacitor such as the tantalum type, it is apparent that the capacitance changes for the ternary alloys of this invention are much less than those acceptable for the tantalum type.

An additional advantage of the ternary alloys, and particularly the preferred alloy (55% Nb, 25% Zr, 20% Ti) over prior tantalum and binary alloys is the higher working voltage at which it has been demonstrated the preferred alloy can operate. It is known from tests made an alloy of which one of the present inventors is a co-inventor, that a binary alloy with 80% niobium and 20% titanium can be anodized at as high as 300 volts, and that a 75% niobium and 25% zirconium alloy can be anodized up to 400 volts with respective 125° C. working voltages of 210 and 280 volts. By comparison the preferred ternary alloy can be anodized at 600 volts to form a satisfactory dielectric surface oxide. Since electrolytic capacitors are commonly operated at a working voltage of up to 70% of the forming voltage, another reason for using the niobium-zirconium-titanium alloy is the ability to produce capacitors operable at higher voltages than with any binary alloy.

Accordingly, the niobium base ternary alloys of the present invention enable the preparation of electrolytic capacitors which are superior to prior capacitors as to size, characteristic, and performance. Indeed, in many ways, the ternary alloys are superior to tantalum as anodes in capacitors. Finally, because the alloy components are less costly and the anodes tolerate higher levels of impurities than does tantalum, the cost of the alloys will be appreciably less than that of tantalum which should make them economically competitive for use in electrolytic capacitors.

It should be understood that the ternary alloy foils, sheet, plates or wire can be etched to develop a larger effective surface area and following this with the anodizing treatment, and thereby increase the capacitance per square inch of foil or other shape. The etching can be chemical or electrolytic. Such etching treatments are well known, for instance see U.S. Patent 2,755,238.

It should be understood that the above description and drawing are illustrative only.

We claim as our invention:

1. An electrolytic capacitor comprising an electrolyte and spaced electrodes disposed therein, at least one of said electrodes comprising an alloy consisting essentially of from 28% to 65% of niobium, from 10% to 50% of titanium and from 20% to 52% of zirconium, the zirconium including up to 2.3% hafnium and including not more than about 0.2% by weight of impurities, and the said electrode having a dielectric oxide film thereon.

2. An electrolytic capacitor comprising an electrolyte and spaced electrodes disposed therein, at least one of said electrodes comprising an alloy consisting essentially of from 50% to 60% of niobium, 20% to 30% of zirconium, the zirconium including up to 2.3% hafnium and from 15% to 25% of titanium, and including not more than about 0.2% by weight of impurities, and the said electrode having a dielectric oxide film thereon.

3. An electrolytic capacitor comprising an electrolyte and spaced electrodes disposed therein, at least one of said electrodes comprising an alloy consisting essentially of about 55% niobium, 25% zirconium, the zirconium including up to 2.3% hafnium and 20% of titanium and including not more than about 0.2% by weight of impurities, and the said electrode having a dielectric oxide film thereon.

4. In an electrical device, a member of an alloy consisting essentially of from 28% to 65% of niobium, from 10% to 65% of titanium and from 20% to 52% of zirconium, the zirconium including up to 2.3% hafnium and including not more than about 0.2% by weight of impurities, the member having surfaces anodically oxidized, and the said electrode having a dielectric oxide film thereon.

5. An electrode suitable for use in an electrolytic capacitor comprising an alloy consisting essentially of from 28% to 65% of niobium, from 10% to 50% of titanium and from 20% to 52% of zirconium, the zirconium including up to 2.3% hafnium and including not more than about 0.2% by weight of impurities, the electrode having a dielectric anodic oxide film thereon.

6. An electrode suitable for use in an electrolytic capacitor comprising an alloy consisting essentially of from 50% to 60% of niobium, 20% to 30% of zirconium, the zirconium including up to 2.3% hafnium and from 15% to 25% of titanium, and including not more than about 0.2% by weight of impurities, the electrode having a dielectric anodic oxide film thereon.

7. An electrode suitable for use in an electrolytic capacitor comprising an alloy consisting essentially about 55% niobium, 25% zirconium, the zirconium including up to 2.3% hafnium and 20% of titanium and including not more than about 0.2% by weight of impurities, the electrodes having a dielectric anodic oxide film thereon.

References Cited by the Examiner
UNITED STATES PATENTS

| 3,244,946 | 4/1966 | Hilton | 317—230 |

References Cited by the Applicant
UNITED STATES PATENTS

| 2,504,178 | 4/1950 | Burnham et al. |
| 2,965,816 | 12/1960 | Ross. |
| 3,046,457 | 7/1962 | Scholte. |
| 3,126,503 | 3/1964 | Solomon. |

JAMES D. KALLAM, *Primary Examiner.*